July 12, 1927.

J. C. DE PENNING

SAW

Filed July 19, 1926

1,635,465

INVENTOR.
John C. DePenning.
BY
ATTORNEY

Patented July 12, 1927.

1,635,465

UNITED STATES PATENT OFFICE.

JOHN C. DE PENNING, OF PORTLAND, OREGON, ASSIGNOR TO CENTRAL DOOR AND LUMBER COMPANY, OF PORTLAND, OREGON, A CORPORATION.

SAW.

Application filed July 19, 1926. Serial No. 123,571.

My invention relates to wood-cutting saw and has for its particular object the provision of a patching saw adapted to form a kerf wedge-shaped in cross-section and cigar-shaped in plan so as to form the incisions required to carry out my improved patching method described in a co-pending application for patent entitled Method of patching, filed July 19, 1926, Serial No. 123,572.

I attain this object in a circular wood-cutting saw of the character described provided with two sets of cutting teeth, each extending a substantial distance up opposite sides of the saw upon lines receding from radii of said saw and diverging at equal opposite angles. The teeth in said oppositely disposed sets register with each other and meet at the periphery to form sharp points, the cutting edges of said teeth extending inwardly from said points, lying wholly within divergent planes, thereby adapted to form a kerf wedge-shaped in cross-section and cigar-shaped in plan.

Figure 1:
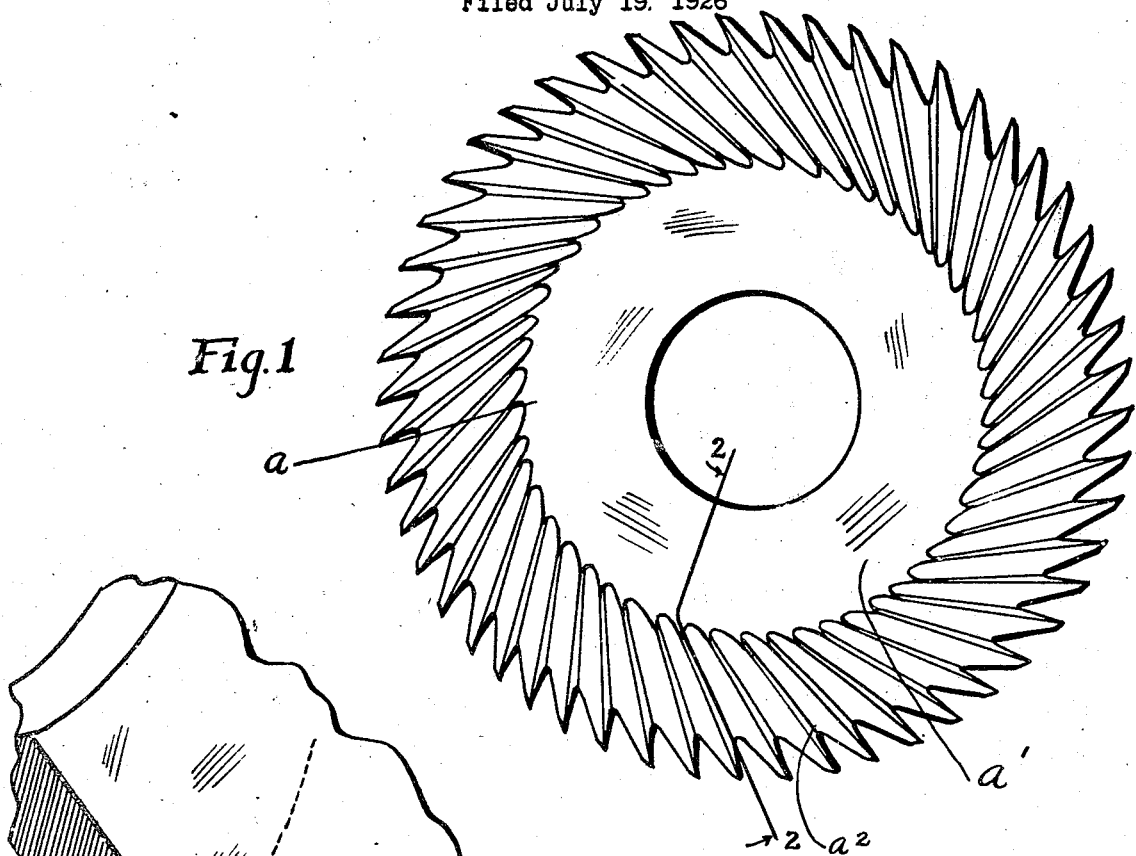

The details of my improved saw are hereinafter described in greater detail with reference to the accompanying drawings, in which:

Fig. 1 is an elevation of said saw; and

Figure 2:
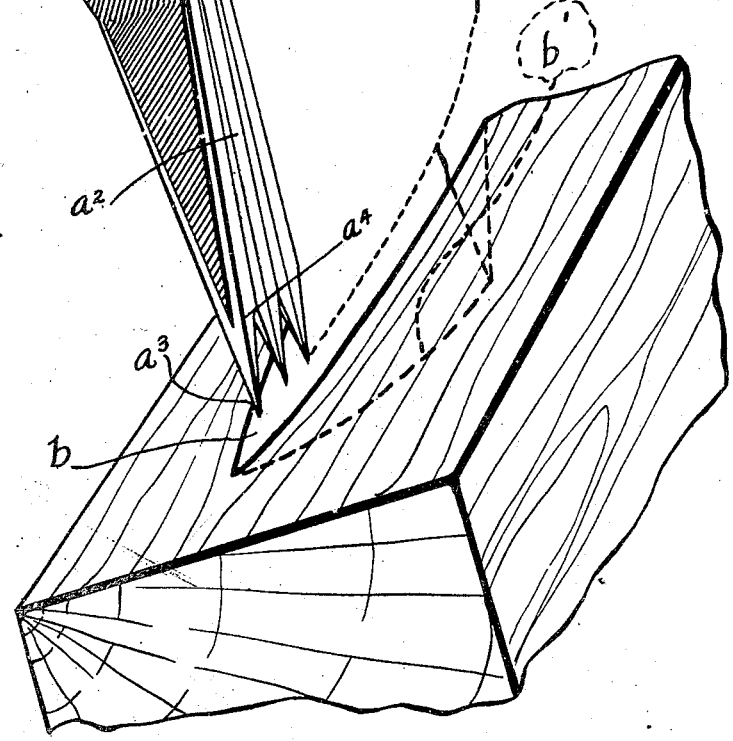

Fig. 2 an enlarged fragmentary section through the latter, shown super-imposed over a kerf formed thereby.

My improved saw $a$ preferably is formed with parallel sides $a'$ and has two sets of teeth $a^2$ formed about its periphery. Said sets of teeth are formed one upon each of said sides and diverge angularly from the periphery at substantially equal opposite angles. The separate teeth in each of said sets are in registration with the similar teeth in the set in the opposite side and thus form sharp spaced points $a^3$ about periphery. The teeth in registration are each provided with cutting edges $a^4$ extending inwardly from said points up each side of the saw and said cutting edges $a^4$ extend wholly within divergent planes so as to form a kerf $b$ which is wedge-shaped in cross section.

As is noted in my co-pending application a saw used in patching is mounted upon a mandrel, which may be moved relatively toward and from the board to be patched and thus when my improved saw $a$ is lowered into such board and not moved longitudinally thereto, a kerf $b$ is formed which is cigar-shaped in section and the base portion $b'$ thereof is a continuous curve.

In practice a patching saw of the character described is provided with teeth extending inwardly substantially a fifth of its diameter and about five times its thickness so as to permit a substantial variance in the depth and width of the kerf to be formed for the reason that pitch pockets and other imperfections to be removed by such kerf vary considerably in width and depth. That is, an imperfection to be removed is cut away merely by lowering said saw into the board and sometimes in drawing said board and said saw longitudinally relatively to each other. The deeper a saw kerf is formed by said saw the greater its width and thus to permit the removal of deep and wide pitch pockets it is necessary that such teeth $a'$ be of considerable length and divergence to be capable of removing large pitch pockets.

One size patching saw, for example, is approximately five and one-half inches in diameter and the teeth extend inwardly from its periphery about one inch, the blade of the saw being approximately one-fourth of an inch thick.

It is to be noted that the saw teeth are arranged so that if the saw is rotated in one direction (counterclockwise as viewed in Fig. 1) the points $a^3$ will be in advance of the remainder of the cutting edges $a^4$. The "lead" or angle given such teeth is such that if lines were extended along the cutting edges of such teeth, such lines would all be substantially tangential to a circle of one-half the diameter of the saw. In the saw shown in Fig. 1, such circle would be located approximately one-third of the way between the roots of such saw teeth and the eye thereof. Without this "lead" or angle the saw would be ineffective to clear out the chips from the kerf. That is, the cutting edge or point of the ordinary saw is swaged so as to cut a wider kerf than the thickness of the root of the tooth and the blade thereof, to provide clearance therefor. This, of course, is not possible in my improved saw because the teeth necessarily terminate in points, and the remainder of the cutting edges of the teeth diverge therefrom.

I do not wish to limit myself to these proportions or sizes but merely set them out to described one convenient form of my invention.

I claim:

1. A circular wood-cutting saw of the character described having peripheral teeth, the cutting edges of which extend inwardly of the saw a distance substantially greater than the thickness of such saw, the cutting edges of each tooth being in registration with those of the remainder, meeting at the periphery to form a sharp point, such saw teeth thus being arranged to form a kerf of uniform, wedge-shaped cross-section.

2. A circular wood-cutting saw of the character described having teeth, the cutting edges of which extend inwardly of the saw a distance in excess of one-third of the radius of such saw, the cutting edges of each tooth being in registration with those of the remainder, meeting at the peirphery to form a sharp point, such saw teeth thus being arranged to form a kerf of uniform, wedge-shaped cross-section.

3. A circular wood-cutting saw of the character described having teeth, the cutting edges of which extend inwardly of the saw a substantial distance, the cutting edges of each tooth being in registration with those of the remainder, meeting at the periphery to form a sharp point, such saw teeth thus being arranged to form a kerf of uniform, wedge-shaped cross-section, such cutting edges being inclined towards their points along lines substantially tangential to a circle approximately one-half the diameter of the saw.

JOHN C. DE PENNING.